United States Patent [19]

Berti et al.

[11] 4,252,466

[45] Feb. 24, 1981

[54] ADJUSTABLE APPARATUS FOR SUPPORTING A PIPE, LAID ON A DEEP SEA BED, AT A DEPRESSION IN THE SEA BED

[75] Inventors: Alfredo Berti, Fano; Antonio Rognoni, Pavia, both of Italy

[73] Assignee: Snamprogetti, S.p.A., Milan, Italy

[21] Appl. No.: 81,489

[22] Filed: Oct. 3, 1979

[30] Foreign Application Priority Data

Oct. 17, 1978 [IT] Italy .............................. 28824 A/78

[51] Int. Cl.³ ........................ E02D 27/52; F16L 3/10
[52] U.S. Cl. .................................... 405/172; 248/49; 405/158
[58] Field of Search ............... 405/172, 171, 154, 156, 405/157, 158, 173; 248/49

[56] References Cited

U.S. PATENT DOCUMENTS

| 3,523,667 | 8/1970 | Guerrero | 248/49 |
| 3,903,704 | 9/1975 | Spiridonov | 405/172 |
| 4,140,292 | 2/1979 | Kaigler, Jr. | 248/49 |
| 4,146,345 | 3/1979 | Silvestri | 405/172 |
| 4,147,455 | 4/1979 | Bertaccini | 405/172 |

*Primary Examiner*—Stephen J. Novosad
*Attorney, Agent, or Firm*—Morgan, Finnegan, Pine, Foley & Lee

[57] ABSTRACT

This invention relates to an adjustable apparatus for supporting a pipe, laid on a deep sea bed, at a depression in the sea bed. The apparatus according to the invention comprises an upper floating caisson provided with support legs and a lower support structure comprising guide tubes for said legs. The guide tubes are rigidly connected by cross members, which can be rotated from a rest position to a work position, in which they support the pipe.

6 Claims, 8 Drawing Figures

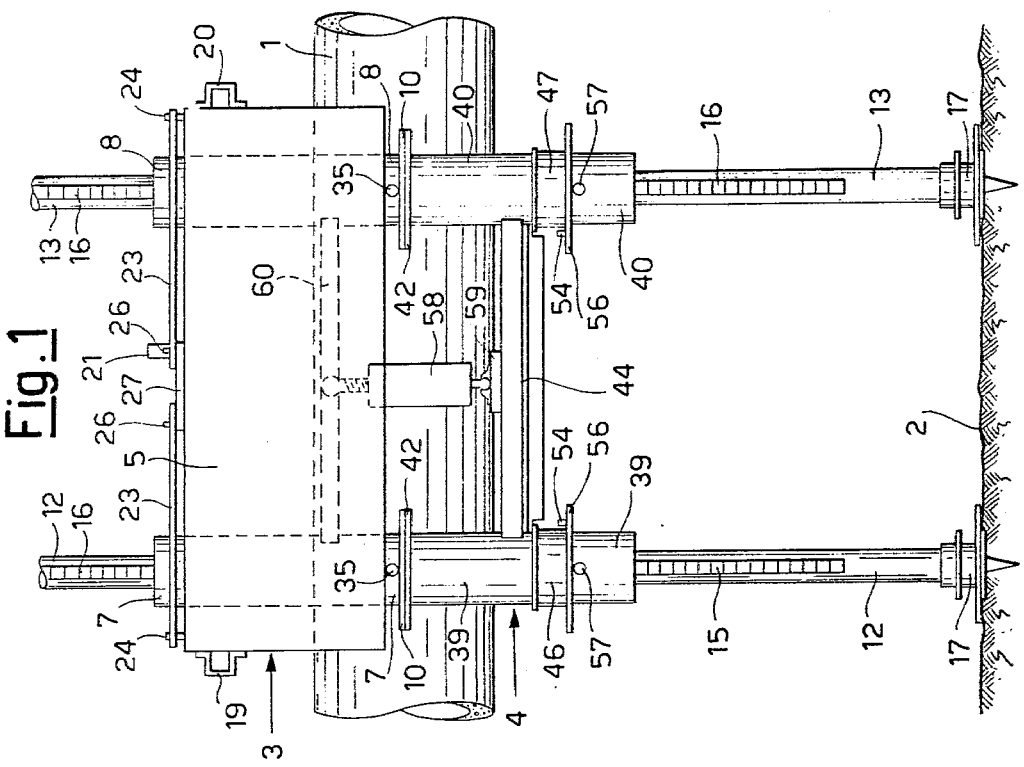
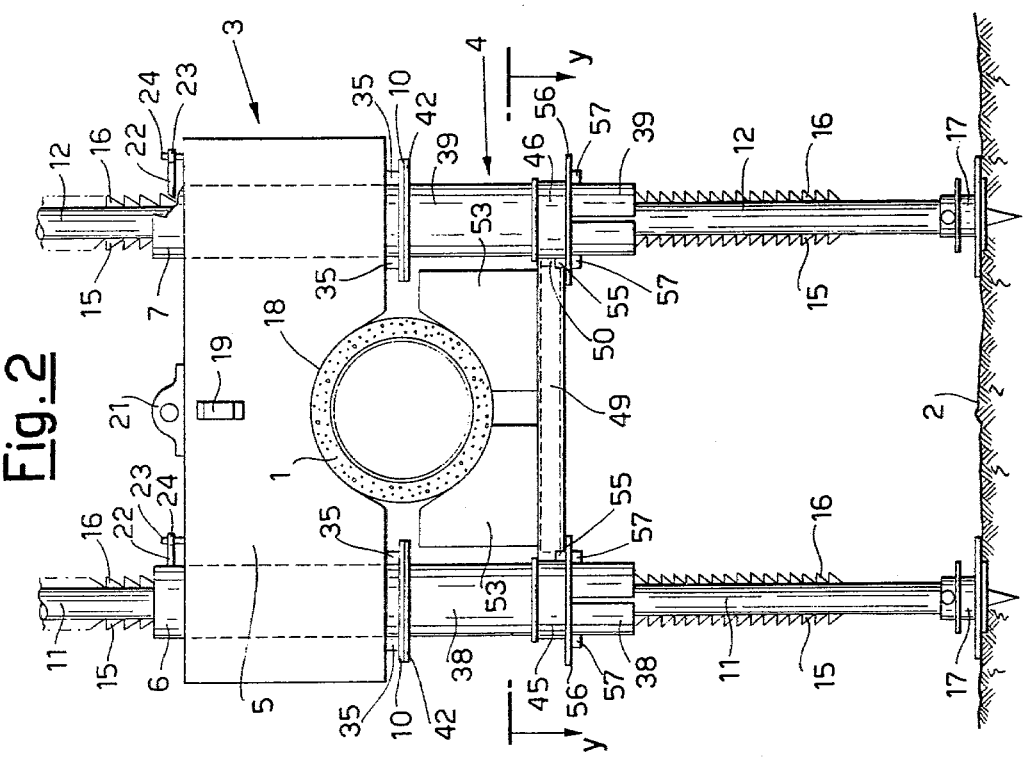

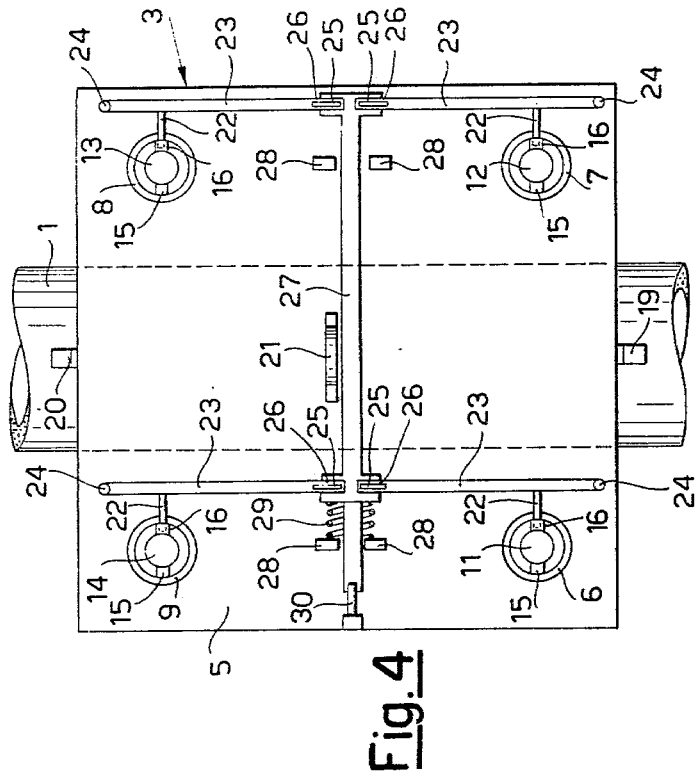
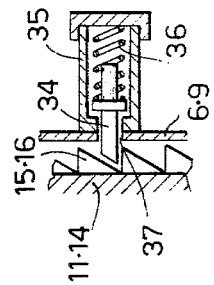
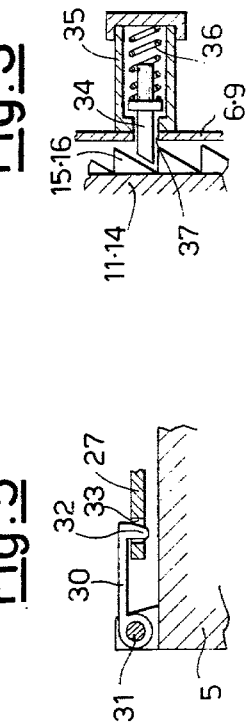
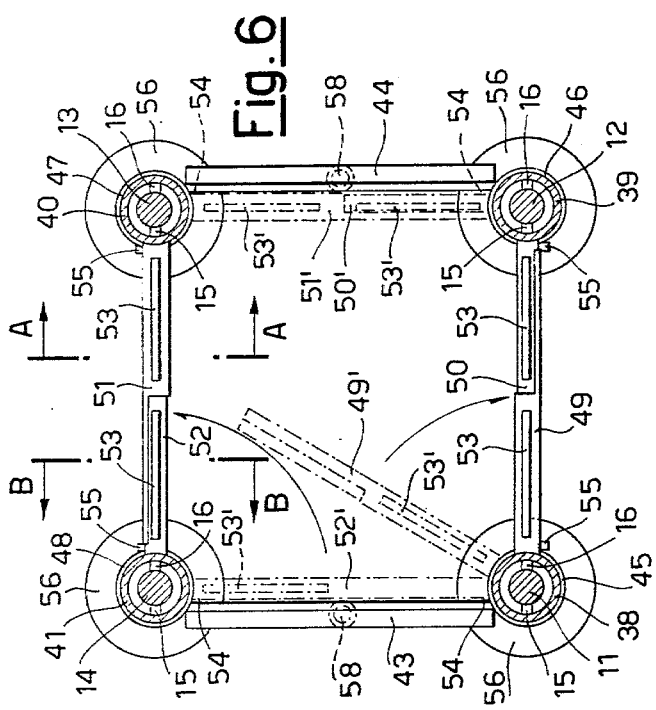
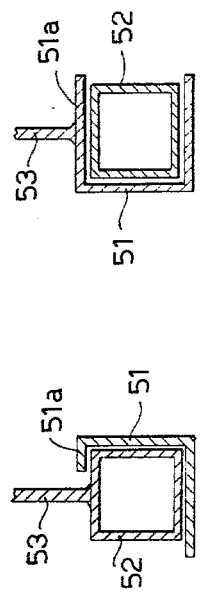

ADJUSTABLE APPARATUS FOR SUPPORTING A PIPE, LAID ON A DEEP SEA BED, AT A DEPRESSION IN THE SEA BED

This invention relates to a simple and economical adjustable apparatus which is of small vertical size and can be easily installed by simple operations carried out by divers or a submarine, and which not only enables a pipe suspended at random on a deep sea bed to be supported, but also enables said pipe to be subjected to an upward stress in order to give it a predetermined optimum geometrical configuration, whatever the distance between the pipe and the sea bed, and whatever the configuration, slope or nature of the sea bed.

Various types of adjustable apparatus for supporting a pipe suspended over depressions in deep sea beds are already known to the state of the art. Certain of these known apparatus, besides being very complicated and therefore costly structures, have the drawback of having to be lowered from the depot ship on to the pipe to be supported by means of cables fixed to the pipe.

The consequence of this is that depot ships have to be used which are able to be anchored at great depths and thus represent very costly craft. On the other hand, as the depot ship remains connected to the pipe by means of said guide cables, any movement made by it is transmitted to the pipe, with the consequent serious danger of fracturing it. These drawbacks are obviated in other types of known apparatus such as those described in our previous U.S. Pat. No. 4,147,455 filed on Apr. 3, 1979, which require no connection between the pipe and depot ship, and therefore enable a depot ship to be used which is not anchored, and thus represents a particularly economical craft from which said apparatus are simply lowered on to the sea bed and are then dragged under the pipe to be supported by a submarine. However, these latter known apparatus also have considerable drawbacks, the first of which arises because of their considerable vertical size, which means that they cannot be used in all those cases in which the pipe to be supported is fairly close to the sea bed. Moreover, as they have to be dragged by a submarine under the pipe to be supported on account of their bulk, and as they comprise a large base which rests on the sea bed, their use is obviously limited only to the case of a flat sea bed free from roughness, because a sea bed which is ununiform or strongly sloping, as is often encountered at great depth, would give rise to considerable problems in dragging the apparatus, or indeed would make it impossible.

The object of the present invention is to obviate the aforesaid drawbacks and to provide an adjustable apparatus which enables a pipe suspended over a depression in a deep sea bed to be supported, whatever the distance between the pipe and the sea bed, and for any configuration, slope or nature of the sea bed.

This is substantially attained by providing an apparatus of simple structure and easy installation which is of small vertical size, and which can be easily conveyed by a submarine on to the pipe to be supported, instead of being dragged.

More specifically, according to one characteristic of the present invention, the adjustable apparatus for supporting a submerged pipe comprises an upper structure consisting of a floating caisson with a substantially square base and containing lowerly a longitudinal saddle recess for said pipe to be supported, and provided on its two transverse sides with two handles for gripping the apparatus by a submarine, and on its roof with a ring for a support cable, there being welded to the inside of the caisson in proximity to its four vertices four vertical guide tubes which emerge from the caisson and into which are slidably inserted four support legs each provided with two opposing gullet tooth racks, means being provided for releasably locking said caisson to said legs and means for preventing said caisson from sliding downwards but not upwards relative to said legs, there being further provided a lower support structure consisting of four corresponding vertical guide tubes into which said four support legs are slidably inserted, said tubes being rigidly connected together longitudinally by two horizontal connecting cross members and supporting in proximity to their lower ends, by means of vertical hinges, four rotatable cross members provided upperly with semisaddles for supporting the pipe to be supported, and which can be rotated through 90° from a rest position, in which said cross members are positioned longitudinally, to a final or working position in which said cross members are positioned transversely and, by associating their semisaddles with each other in pairs, constitute two complete saddles for supporting the pipe to be supported, said rotation of the rotatable cross members being limited by shoulder stops provided with snap locks for locking the cross members in position and being supported by said vertical guide tubes, means being provided for preventing any downward sliding but not upward sliding of said lower support structure relative to said legs, said two structures being provided with means for sliding them upwards relative to said support legs.

According to a further characteristic of the present invention, of the four said rotatable cross members provided with semisaddles, the two which have to be the first to be rotated into their working position are each constituted by a C beam, the upper flange of which, on to which the semisaddle is fixed, is of reduced width from the center of the beam length onwards, whereas the other two cross members, which are the second to be rotated into their working position, each consist of a composite double L beam which, when in its working position, is inserted into the cavity of one of said C beams and is fitted upperly with the semisaddle in the region which faces the reduced width flange of said C beam.

According to a further characteristic of the present invention, said means for releasably locking said caisson to said support legs provided with gullet tooth racks are constituted by four pins which are inserted into the teeth of four corresponding racks on the support legs, said pins being perpendicularly rigid with four levers disposed perpendicularly to said racks and hinged at one end to the roof of said floating caisson at their other end to a central rod supported to slide perpendicularly to said levers on said caisson roof, said rod being kept displaced towards said racks, and thus said pins being kept inserted into the teeth of said racks, by a hook member which is hinged to said caisson roof and inserts its hook into a vertical bore provided at the end of said central control rod, and compresses a spring acting between said rod and a block rigid with said caisson roof.

From the description it is immediately apparent that to release said floating caisson from said support legs it is necessary only to rotate said hook member upwards. In this respect, on doing this the central control rod is freed and, by the action of said spring, is displaced in the opposite direction to the racks, so rotating said levers in order to simultaneously cause said pins to escape from the teeth of the support leg racks.

According to a further characteristic of the present invention, said means for preventing said floating caisson and said lower support structure from sliding downwards but not upwards relative to said support legs are constituted by pins which are supported in boxes fixed to said vertical guide tubes both of the floating caisson and of the lower support structure in opposition to all the gullet tooth racks of said support legs, and are kept resiliently inserted by springs into the teeth of said racks by passing through corresponding bores in said vertical guide tubes.

According to a preferred embodiment of the present invention, said means for sliding the two said structures upwards relative to said support legs are constituted by two double acting hydraulic jacks hinged respectively between the two said horizontal cross members which longitudinally connect together the guide tubes of said lower support structure, and two overlying horizontal cross members welded longitudinally to the guide tubes of said upper structure.

Finally, in order to be able to recover said upper structure complete with jacks for subsequent re-use, according to a further preferred embodiment of the present invention said double acting hydraulic jacks are hinged to the two said horizontal cross members which longitudinally connect together the guide tubes of said lower support structure, by means of a releasable system.

The invention is described hereinafter with reference to the accompanying drawings which illustrate a preferred embodiment thereof given by way of non-limiting example only, in that technical or constructional modifications can be made thereto without leaving the scope of the present invention.

In said drawings:

FIG. 1 is a side view of the support apparatus according to the invention in a longitudinal direction;

FIG. 2 is a front view of the apparatus of FIG. 1 in a transverse direction;

FIG. 3 is a side section to an enlarged scale through a detail of the apparatus according to the invention, and more specifically a side section through one of the pawls for locking the upward sliding of the floating caisson and lower support structure relative to the support legs;

FIG. 4 is a plan view of the apparatus of FIG. 1;

FIG. 5 is an enlarged view of a detail of FIG. 4;

FIG. 6 is a section through the apparatus according to the invention on the line yy of FIG. 2;

FIG. 7 is a cross-section through the rotatable cross members provided with semisaddles in the apparatus according to the invention, taken on the line AA of FIG. 6;

FIG. 8 is a cross-section through the rotatable cross members provided with semisaddles in the apparatus according to the invention, taken on the line BB of FIG. 6.

With reference to the figures, the reference numeral 1 indicates a submerged pipe which is suspended over a depression in the sea bed 2, and is to be supported by the apparatus according to the invention. Said apparatus comprises an upper structure 3 and a lower support structure 4 which are separate from each other. The upper structure 3 is constituted by a substantially square based floating caisson 5 to which four vertical guide tubes, 6, 7, 8 and 9 respectively, are welded to its interior in proximity of its four vertices, and emerge from the caisson to terminate lowerly in shoulder flanges 10. Four support legs, 11, 12, 13 and 14 respectively, are inserted into said four vertical guide tubes so that they can slide vertically but cannot rotate, and are each provided with two opposing gullet toothed racks 15 and 16 terminating lowerly in a support base 17, the point of which is inserted into the sea bed 2. The caisson 5 comprises in its lower face a longitudinal central saddle depression 18 for the pipe 1 to be supported, and is provided on its two transverse sides with two handles 19 and 20 to be gripped by a submarine, and on its upper face or roof with a ring 21 for a support cable. On the upper face or roof of the caisson 5 there is mounted a mechanism for releasably locking said upper structure 3 of the apparatus to said support legs 11 to 14. Said mechanism is constituted (see FIG. 4 specifically) by five pins 22 which are inserted into the teeth of the racks 16 on the support legs 11 to 14. Said pins are perpendicularly rigid with four levers 23 disposed perpendicularly to the racks 16 and hinged at their ends 24 to the roof of the caisson 5, and are provided at their other ends with an elongated eyelet 25 into each of which is inserted a pin 26 of a single central control rod 27 supported to slide perpendicularly to said levers 23 on the roof of the caisson 5 by guides 28 fixed to said roof. Said rod 27 is opposed by a spring 29 acting between it and one of the guides 28 in the sense of urging it towards the right (with reference to FIG. 4) and thus withdrawing the pins 22 from the teeth of the racks 16, but is kept displaced towards the left, i.e. towards the racks 16, thus compressing said spring 29 and keeping said pins 22 inserted in the teeth of the racks 16, by a hook member 30 which is hinged at 31 to the roof of the caisson 5 (see FIG. 5 specifically), and inserts its hook 32 into a vertical bore 33 provided at the end of said rod 27. To release the upper structure 3 of the apparatus from the support legs 11 to 14, it is therefore necessary merely to release said hook member 30 from the rod 27 by rotating it upwards. Finally, said upper structure 3 of the apparatus is provided with stops which prevent its downward sliding but not its upward sliding relative to said support legs 11 to 14, said stops being constituted by eight pins 34 (see FIG. 3 specifically) which are supported in eight boxes 35 fixed to said vertical guide tube 6 to 9 in opposition to all the gullet tooth racks 15, 16 of the support legs 11 to 14, and are kept resiliently inserted by springs 36 in the gullet teeth of said racks by passing through corresponding bore 37 in the guide tubes 6 to 9.

In this manner, any downward sliding of said guide tubes and consequently of the entire upper structure 3 of the apparatus relative to the support legs is prevented by the fact that said pins 34 abut against the horizontal edge of the teeth of the racks 15, 16 (see FIG. 3), whereas upward sliding is permitted in that said pins 34, by compressing their springs 36, can slide along the inclined edge of said teeth.

The lower structure 4 of the apparatus is constituted by four vertical guide tubes 38, 39, 40, 41, provided upperly with shoulder flanges 42 and disposed to correspond to said guide tubes 6 to 9 of the upper structure 3, into which said four support legs 11 to 14 are inserted vertically slidable but not rotatable. Said guide tubes 38 to 41 are rigidly connected together longitudinally by two horizontal connection cross members 43 and 44 which connect the guide tube 38 to the guide tube 41 and the guide tube 39 to the guide tube 40 respectively, and support in proximity to their lower ends, by means of vertical hinges 45, 46, 47 and 48, four rotatable cross members 49, 50, 51 and 52 respectively, which are provided upperly with semisaddles 53 for supporting the pipe 1 to be supported. Said rotatable cross members 49 to 52 can be rotated through 90° from a rest position, in which said cross members are positioned longitudinally, i.e. parallel to said connection cross members 43 and 44 (the cross members are indicated in said rest position in FIG. 6 by dashed lines and by corresponding accentuated numbers, with the exception of the cross member 49' which is indicated in an intermediate position during its rotation), to a final or working position (indicated by full lines in FIG. 6) in which said cross members are positioned transversely, with the semisaddle of the cross member 49 coupled to that of the cross member 50 and the semisaddle of the cross member 51 coupled to that of the cross member 52 to thus constitute two complete saddles for supporting the pipe 1.

Said rotation of the rotatable cross members 49 to 52 is limited in their rest position by normal shoulder stops 54 provided with a snap system for locking the cross members in position, and in their working position by similar shoulder stops 55, all of said stops 54, 55 being supported by support flanges 56 fixed to said guide tubes 38 to 41. The two cross members 49 and 51, which are the first to be rotated into their working position, are each constituted by a C beam (see FIG. 6 and, specifically, FIGS. 7 and 8), the upper flange of which, e.g. 51a, on which the semisaddle 53 is fixed, is reduced in width from the centre of the beam length onwards in order to enable the semisaddle 53 of the other two rotatable cross members 50 and 52 to emerge, these latter being each constituted by a composite double L beam which when in its working position is inserted in the cavity of the corresponding C beam. The lower structure 4 of the apparatus is also provided with stops 57 which prevent it from sliding vertically downwards but not upwards relative to the support legs 11 to 14, said stops being perfectly similar to those used for the upper structure 3 as previously described.

Finally, the upper structure 3 and lower structure 4 of the apparatus are connected together by two double acting hydraulic jacks 58 which are disposed vertically and are respectively hinged lowerly to said horizontal connection cross members 43 and 44 of the lower structure 4 by means of a releasable system 59 of known type, and upperly to two horizontal cross members 60 (only one cross member is visible in FIG. 1, the other opposing it) disposed over the former and welded respectively to the guide tubes 6, 9 and 7, 8 of the upper structure 3. Said jacks 58 are fed in parallel and are operated by way of two connectors disposed on the floating caisson 5 are not shown in the figure, into which the flexible feed hoses from a submarine are plugged.

The installation and the method of operation of such an apparatus are obvious.

The apparatus is prepared on the depot ship by inserting support legs 11 to 14 of suitable length from the top into the guide tubes 6 to 9 of the upper structure 3 and into the corresponding guide tubes 38 to 41 of the lower structure 4, then locking the two said structures of the apparatus to said support legs by inserting the hook 32 of the hook member 30 into the vertical bore 33 in the cross member 27, then fixing the support bases 17 to the lower ends of said support legs, then locking the rotatable cross members 49 to 52 in the longitudinal direction in their rest position and adjusting the floating characteristics of the caisson 5 in such a manner that the apparatus has a suitable residual weight in water. The apparatus is then lowered on to the sea bed 2 by means of a support cable hooked to the ring 21. Said support cable is then released, and the apparatus is taken over by a submarine which acts with its articulated arms on the two handles 19 and 20, and is conveyed on to the pipe 1 to be supported in such a manner that this latter becomes inserted into the saddle recess 18 in the caisson 5. At this point, the rotatable cross members 49 to 52 are moved into their working position, in which they become automatically locked, by rotating them in the sequence 49, 51, 50, 52 by means of an articulated arm of said submarine, and the hook member 30 is withdrawn by rotating it upwards by means of an articulated arm of the submarine in order to release the support legs 11 to 14, which thus fall by their own weight and become embedded in the sea bed 2.

The flexible feed hoses from the submarine are then connected to the feed connectors for the two hydraulic jacks 58, which are operated simultaneously firstly in the sense of raising the upper structure 3 by exerting force on the lower structure 4 which remains fixed together with the pipe 1, in that its downward movement is prevented by the stops 57, and then in the sense of thrusting the lower structure 4 and thus the pipe by exerting force on the upper structure 3 which is prevented from moving downwards by the stops 35. The said alternate upward movement of the two structures 3 and 4 is repeated until the pipe 1 is perfectly supported by the lower structure 4 or is raised by the necessary amount to give it the predetermined optimum geometrical configuration for the pipe, and finally after uncoupling said feed hoses from the connectors and opening the systems 59 which hinge the hydraulic jacks to the cross members 43 and 44 of the lower strucure, the upper structure 3 complete with said jacks is recovered on to the depot ship by upwardly withdrawing the upper structure from said support legs by means of a support cable hooked to the ring 21.

As stated, it is apparent that modifications can be made to the apparatus. Thus, instead of using double acting hydraulic jacks for lifting the two structures of the apparatus, gear wheels can be used which engage with the racks on the support legs and are rotated by electric or hydraulic motors, or a simple elevator can be used which acts under the pipe and rests on the sea bed. These applications give rise to no difficulties and require only small adaptations well known to an expert of the art.

We claim:

1. An adjustable apparatus for supporting a pipe, laid on a deep sea bed, at a depression in the sea bed, said apparatus being lowered on to the sea bed from a depot ship by means of a support cable, and conveyed on to the pipe to be supported by divers or a submarine, comprising an upper structure consisting of a floating caisson with a substantially square base and containing lowerly a longitudinal saddle recess for said pipe to be supported, and provided on its two transverse sides with two handles for gripping the apparatus by said submarine or divers, and on its roof with a ring for said support cable, there being welded to the inside of the caisson in proximity to its four vertices four vertical guide tubes which emerge from the caisson and into which are slidably inserted four support legs each provided with two opposing gullet tooth racks, means being provided for releasably locking said caisson to said legs and means for preventing said caisson from sliding downwards but not upwards relative to said legs, there being further provided a lower support structure consisting of four corresponding vertical guide tubes into which said four support legs are slidably inserted, said tubes being rigidly connected together longitudinally by two horizontal connecting cross members and supporting in proximity to their lower ends, by means of vertical hinges, four rotatable cross members provided upperly with semisaddles for supporting the pipe to be supported, and which can be rotated through 90° from a rest position, in which said cross members are positioned longitudinally, to a final or working position in which said cross members are positioned transversely and, by associating their semisaddles with each other in parts, constitute two complete saddles for supporting said pipe to be supported said rotation of the rotatable cross members being limited by shoulder stops provided with snap locks for locking the cross members in position and being supported by said vertical guide tubes, means being provided for preventing any downward sliding but not upward sliding of said lower support structure relative to said legs, said two structures being provided with means for sliding them upwards relative to said support legs.

2. An apparatus as claimed in claim 1, wherein of the four said rotatable cross members provided with semisaddles, the two which have to be the first to be rotated into their working position are each constituted by a C beam, the upper flange of which, on to which the semisaddle is fixed, is of reduced width from the center of the beam length onwards, whereas the other two cross members, which are the second to be rotated into their working position, each consist of a composite double L beam which, when in its working position, is inserted into the cavity of one of said C beams and is fitted upperly with the semisaddle in the region which faces the reduced width flange of said C beam.

3. An apparatus as claimed in claim 1, wherein said means for releasably locking said caisson to said support legs provided with gullet tooth racks are constituted by four pins which are inserted into the teeth of four corresponding racks on the support legs, said pins being perpendicularly rigid with four levers disposed perpendicularly to said racks and hinged at one end to the roof of said floating caisson and at their other end to a central control rod supported to slide perpendicularly to said levers on said caisson roof, said rod being kept displaced towards said racks, and thus said pins being kept inserted into the teeth of said racks, by a hook member which is hinged to the roof of said caisson and inserts its hook into a vertical bore provided at the end of said central control rod, and compresses a spring acting between said rod and a block rigid with said caisson roof.

4. An apparatus as claimed in claim 1, wherein said means for preventing said floating caisson and said lower support structure from sliding downwards but not upwards relative to said support legs are constituted by pins which are supported in boxes fixed to said vertical guide tubes both of the floating caisson and of the lower support structure in opposition to all the gullet tooth racks of said support legs, and are kept resiliently inserted by springs into the teeth of said racks by passing through corresponding bores in said vertical guide tubes.

5. An apparatus as claimed in claim 1, wherein said means for sliding the two said structures upwards relative to said support legs are constituted by two double acting hydraulic jacks hinged respectively between the two said horizontal cross members which longitudinally connect together the guide tubes of said lower support structure, and two overlying horizontal cross members welded longitudinally to the guide tubes of said upper structure.

6. An apparatus as claimed in the preceding claim, wherein said double acting hydraulic jacks are hinged to the two said horizontal cross members which longitudinally connect together the guide tubes of said lower support structure, by means of a releasable system.

* * * * *